Patented Nov. 12, 1935

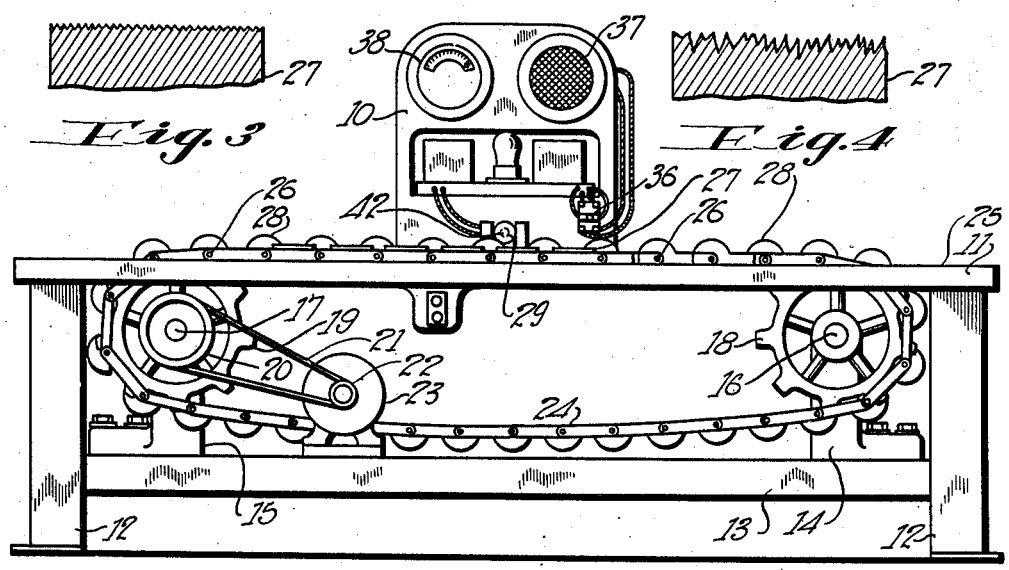

2,020,548

UNITED STATES PATENT OFFICE 2,020,548

TESTING APPARATUS FOR SURFACE FINISH

Robert E. W. Harrison, Cincinnati, Ohio, assignor to Cincinnati Grinders Incorporated, Cincinnati, Ohio, a corporation of Ohio Application October 21, 1930, Serial No. 490,245

6 Claims. (Cl. 73—51)

This invention relates to improvements in apparatus for testing and comparing machine finished surfaces.

In the past, the quality of finish or surface produced on work pieces was determined or classified by either the operator of the machine producing the finish or surface, the man in charge, or the inspector passing on the work and its finish at its alleged completion. In other words, the quality of the finish or surface was determined by eye by various parties having a more or less extended experience in such matters. It is a well known fact that what would be a good finish to one man or examiner would be an excellent or poor finish to another depending solely on the type or quality of work accustomed to be received or produced. By a device of this invention the quality or type of finish can be readily determined or ascertained, as well as compared with a formerly established determinator.

It is, therefore, one of the principal objects of the present invention to provide a mechanism for determining the quality of surface or finish on a machined article.

Another object of the invention is the provision of a mechanism for visibly and audibly indicating the quality of surface finish of machined articles.

Another object of the invention is the provision of a self-contained testing mechanism for presenting successive work pieces to a surface indicator for proper determination thereof.

Other objects and advantages of the present invention should be readily apparent by reference to the following specification considered in conjunction with the accompanying drawing illustrating one possible form of the invention and it is to be understood that any modifications may be made in the exact structural details there shown and described, within the scope of the appended claims, without departing from or exceeding the spirit of the invention.

In the drawing:

Figure 1 is a front elevational view of a testing or inspection mechanism embodying the improvements of this invention.

Figure 2 is a diagrammatic view illustrating the indicating mechanism as employed in this invention.

Figure 3 is a fragmentary sectional view of a work piece, many times enlarged, illustrating a relatively good, uniform finish.

Figure 4 is a fragmentary sectional view of a work piece, many times enlarged, similar to Figure 3, but indicating a poor, ununiform finish.

Figure 5 is a diagrammatic view of a modification embodying the invention.

Figure 6 is a side elevation of the generator head and its supporting arm, the main casing 10 being shown in section.

As was noted above, the machine finish on work pieces and especially the grinding finish, was heretofore classified by sight of various individuals whose opinions of the quality of the finish varied greatly depending on experience, use, and other circumstances. By the use of this invention the unreliable opinions of the various individuals may be discarded and the finish on the work minutely and positively measured and determined and the finish on successive work pieces accurately compared.

Referring now to the drawing illustrating one possible embodiment of the invention in which similar reference characters are employed to denote the same or similar parts. The reference character 10 indicates a housing containing the measuring and determining mechanism. The housing 10 may be supported on an extension of a table or bench 11 which comprises legs 12 supporting a shelf 13. Brackets 14 and 15 are carried by the shelf 13 and have journaled in them shafts 16 and 17, the former supporting the idler sprocket 18 while the latter has secured thereto the driving sprocket 19. A pulley 20 is also secured on the shaft 17 connected by transmission belt or the like 21 with a pulley 22 on the shaft of a motor or prime mover 23 supported by the shaft 13 in operative relation to the support or pedestal 15. A carrier chain or belt 24 is trained about the sprockets 18 and 19 for carrying work pieces along the upper surface 25 of the table 11 for presentation to the testing mechanism in the housing 10. The opposite sides of the transmission belt 24 are connected by pins or the like 26 which serve as abutments for the work 27 and urge said work along the surface 25. One side of the belt 24 is provided with a series of cams 28 adjacent to which the opposite ends of successive work pieces are positioned while being transported past the testing apparatus for a purpose later to appear.

In general, the testing and inspection apparatus for determining the surface finish on work pieces comprises a means for setting up pulsations or impulses representative of the finish being tested or inspected, which pulsations or impulses are then measured to determine their characteristics which indicate the quality of the finish being tested. More specifically, the invention comprises generating impulses representative of the surface being tested or inspected amplifying said impulses to a point for operating an air vibrator or loud speaker, or when the impulses are electrical for operating a current flow meter, or an electrical current oscillations recorder, such as an oscillograph.

The testing and measuring apparatus shown in the drawing comprises a pulsations generator 29 of the electro-magnetic type for engagement with the work for setting up an alternating current or electrical energy pulsations which are fed to any desirable current amplifying mechanism, such as the usual in-put radio amplifying element or tube 30. The electrical energy is transmitted from the in-put amplifying element 30 through the additional amplifying elements or units 31, 32 and 33 terminating in a transformer 34. The secondary circuit 35 extending from the transformer 34 terminates in a double throw switch 36. This switch is utilized for connecting the secondary circuit 35 with an air vibrator or loud speaker 37 whereby the electrical frequency may be heard or for connecting the said secondary circuit with a visible indicator, such as a millivoltmeter 38. In order, however, that the needle or indicating element of the meter 38 may be actuated it may be necessary to further amplify the current as by the amplifying element 39.

The surface of all machined or ground work pieces is composed of a series of ridges and grooves. The closer the ridges to one another and the shallower the groove between the ridges the more perfect the finish and the better the said surface will resist wear. Figure 3 of the drawing illustrates, on a greatly enlarged scale, the surface of a comparatively fine finish while Figure 4 illustrates a relatively poor finish. In Figure 3 it will be noted that the ridges are relatively close to one another and of uniform spacing with the grooves between them comparatively shallow, while in Figure 4 the ridges are unequally spaced having grooves therebetween, in some instances, of considerable depth. By passing a work piece at a uniform speed, as shown in Figure 3, beneath the generator a series of uniform pulsations are generated which will result in a high pitched tone emanating from the loud speaker 37 and will result in a slight deflection of the needle or indicating point of the meter 38. On the other hand the surface of the article, shown in Figure 4, will cause to be generated a current of lower frequency than the frequency produced by Figure 3, which will result in a low, rasping, guttural sound to be received from the speaker and a relatively wide deflection of the needle of the meter. From this it will be seen that finishes of different grades may be readily tested and classified.

The generator 29 may be of any well known electro-magnetic type but as shown in Figure 2 may comprise a field or coil 40 having extending therethrough a magnetic conducting core 41. Coupled to one end of the core 41 is an arm 42 pivoted at 43 and having a chiseled sapphire or other vibrator 44 at its other end. The sapphire 44 is passed over the surface of the work 27 thereby oscillating the arm 42 about its pivot 43 and axially shifting the core 41. The shifting of the core 41 cuts the lines of magnetism of the generator 29 causing electrical pulsations or current to pass along wires 45 having a frequency depending on the number and shape of the ridges and grooves in the surface of the work. The current is fed by the wires 45 to the in-put amplifying element 30, which amplifier in turn passes them through its plate to the secondary circuit 46 of the next amplifying stage 31. The current is again amplified by the element 31 and passed to the secondary circuit 47 of the amplifying stage 32. This is repeated throughout the amplifying stations. Each of the amplifying elements is provided with a filament or electron emitting member 48 which supplies a medium for transferring the current from the primary or in-put circuit of each amplifying unit to the next. Each of the filaments or electron emitting members 48 is connected by a suitable lead to the power pack and rectifier 49 which is coupled through the usual transformer 50 to the main power lines 51 and 52.

It is to be understood that the parts 40—43 shown in Figure 2 comprise the functioning elements of the generator which are as an entirety contained within the casing 29 shown in Figures 1 and 6. The stylus 44 has a lateral swinging movement about the horizontal pivot 43, thus vibrating in accordance with irregularities of the work piece being traversed therebeneath. The generator unit as a whole is carried by the arm 42A which is in turn pivoted to a bracket member or lug projecting forwardly from the casing 10, thus having the capacity for vertical swinging movement in response either to pronounced variations in the position of the stylus, or to the lifting action of the cam members 28.

In order to measure or inspect successive work pieces and to pass the vibrator from one work piece to the next, the cam members 28 are adapted to ride under the arm 42A and raise it out of engagement with the work before the said vibrator can snap off of the end of one work piece and snap back on to the next work piece thereby preventing a very disagreeable noise emanating from the loud speaker and eliminating the wide deflection of the meter at the end and beginning of testing of each work piece. As shown in Figure 1, the work pieces to be inspected or measured are placed at the right hand side of the table 11 with the operator facing the housing or cabinet 10 and positioning successive work pieces on the belt or carrier 24 and placing the finished or inspected work pieces in suitable receptacles or containers placed at the left hand side of the table 11. The arm 42A and generator 29 are held against the work and actuated about the pivot of the arm toward the work by gravity.

In practice and when using the air vibrator or loud speaker 37 as a testing medium a plurality of previously finished pieces conforming to the various standards of finish may be provided and passed beneath the generator to acquaint the operator with the sound or tone to be expected from the speaker as the work pieces to be tested are subjected to the action of the machine. Similarly, the deflection of the needle of the meter may be noted as the standard to which subsequent work pieces must measure up.

The modification, shown in Figure 5, illustrates the use of an oscillograph 53 in place of the millivoltmeter 38. The oscillograph will photographically record the extent of the oscillations in the electrical current set-up by the work and generator. The finer the finish the more uniform the photographic impressions of the oscillations while the poorer the finish the more ununiform or ragged the impressions.

From the foregoing description it will be seen that a device for positively determining the finish on a work piece has been provided which finish may be measured by hearing with the loud speaker, by sight with the current flow meter, or by a graphic record with the oscillograph.

What is claimed is:

1. In a device for testing the surface finish of a work piece, the combination of a support, a finish testing mechanism associated with the support including a housing, a current generator for generating a current representative of the finish being tested and including an arm, and a vibrator carried by the arm, the vibrator being adapted to engage the surface to be tested, the arm being pivotally secured to the housing for movement away from the surface being tested, means for advancing the work relative to the vibrator to actuate said vibrator and generate a current representative of the finish being tested, means for actuating the arm and generator about the pivotal mounting of the arm to prevent the vibrator from snapping off the end of the surface being tested and means carried by the housing for determining the characteristics of the generated current.

2. In a device for testing and determining the finish on machined articles the combination of a table, an endless conveyor on the table for actuating work pieces relative thereto, a vibrator pivotally supported by the table and adapted to engage the surfaces of said work pieces, a generator operated by the vibrator for generating a current representative of the finish being tested which is determined by the rate of vibration of the vibrator, means for amplifying the generated current, means for accurately determining the characteristics of the generated current for thereby accurately determining the finish on the work, and means associated with the endless conveyor for actuating the vibrator about its pivot for raising same from the surface of the work being tested prior to the snapping off of the vibrator from the end of the work.

3. In a mechanism for testing the surface finish on a plurality of work pieces which are actuated in a continuous stream relative to the surface tester the combination of a conveyor for shifting said work pieces, an arm mounted for pivotal movement in a back and forth direction as respects the surface being tested and for additional movement in a direction toward and from said surface, a stylus associated with the arm and contacting with the surface of the work being tested as it is being shifted by the conveyor and whereby the arm is oscillated in one plane about its pivot, a generator associated with the arm for generating a current representative of the oscillations of the arm as imparted thereto through the stylus, means for amplifying the generated current to a measurable amplitude, means for measuring the current, and additional means for oscillating the arm in a plane transverse to that in which it is moved through the stylus for raising said stylus from the surface of the work near opposite ends thereof.

4. In a mechanism for testing the surface finish on a plurality of work pieces which are actuated in a continuous stream relative to the surface tester the combination of a conveyor for shifting said work pieces, an arm mounted for pivotal movement in a back and forth direction as respects the surface being tested and for additional movement in a direction toward and from said surface, a stylus associated with the arm and contacting with the surface of the work being tested as it is being shifted by the conveyor and whereby the arm is oscillated in one plane about its pivot, a generator associated with the arm for generating a current representative of the oscillations of the arm as imparted thereto through the stylus, means for amplifying the generated current to a measurable amplitude, means for measuring the current, additional means for oscillating the arm in a plane transverse to that in which it is moved through the stylus for raising said stylus from the surface of the work near opposite ends thereof, and means for further amplifying the current prior to its flow to the sight or graphic determinators.

5. A machine for testing the accuracy of the surface finish of a multiplicity of work pieces including a support, means for serially translating a multiple number of work pieces consecutively past the support, a direct contact stylus mounted on the support for movement relative thereto and extending in a position to engage and traverse the surface of the work pieces during their translation, a current generator operated by the stylus for generating a current proportional to the variance of the surface of the work piece being tested from a geometrical plane, means for amplifying the generated current, and an instrumentality coupled in the circuit of said amplified current and operable by a generated current of intensity indicative of unsatisfactory finish on the work piece.

6. A mechanism as specified in claim 5 in which automatically operated cam means are provided for intermittently raising and lowering the stylus mechanism to prevent undesirable engagement thereof with the terminal portions of the successive translated work pieces.

ROBERT E. W. HARRISON.